United States Patent
Narayan et al.

(10) Patent No.: US 7,437,524 B2
(45) Date of Patent: Oct. 14, 2008

(54) METHOD AND APPARATUS FOR DUMPING MEMORY

(75) Inventors: Ranjani Narayan, Bangalore (IN); Kiran Kumar Kasturi, Andhra Pradesh (IN); Meera K. Raghunandan, Karnataka (IN); Scott T. Millward, Roseville, CA (US); Sabyasachi Sengupta, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 11/077,665

(22) Filed: Mar. 11, 2005

(65) Prior Publication Data

US 2005/0204107 A1   Sep. 15, 2005

(30) Foreign Application Priority Data

Mar. 13, 2004   (GB) ................... 0405711.3

(51) Int. Cl.
   *G06F 12/16*   (2006.01)
(52) U.S. Cl. ................ 711/161; 711/162; 714/5; 714/6
(58) Field of Classification Search ............... None
   See application file for complete search history.

(56) References Cited

U.S. PATENT DOCUMENTS

| 5,291,600 A | 3/1994 | Lutz et al. ............... 714/15 |
| 5,293,612 A * | 3/1994 | Shingai ................. 711/159 |
| 6,336,174 B1 | 1/2002 | Li et al. ................ 711/162 |
| 6,654,880 B1 * | 11/2003 | Yamamoto ............... 713/1 |
| 6,662,310 B2 | 12/2003 | Lopez et al. ............. 714/15 |
| 6,996,751 B2 * | 2/2006 | Harper et al. ............ 714/48 |
| 2006/0041739 A1 * | 2/2006 | Iwakura et al. ........... 713/2 |

OTHER PUBLICATIONS

Pasha, Akhtar, "The Need for 64-bit Operating Systems", Apr. 2002, http://web.archive.org/web/20020416084929/http://www.expresscomputeronline.com/20020408/focus2.shtml, pp. 1-3.*
Winchell et al., "In Memory Core Dump", Aug. 2003, http://web.archive.org/web/20030823234948/http://missioncriticallinux.com/projects/mcore/readme.php, pp. 1-3.*
"Transfer-of-Control Specifiers", Sep. 2002, http://web.archive.org/web/20020920231057/http://www.cecalc.ula.ve/documentacion/tutoriales/CF77AU/olrm0159.htm, pp. 1-2.*

* cited by examiner

*Primary Examiner*—B. James Peikari (57) ABSTRACT

The present invention relates to a method and apparatus for dumping memory. More particularly a computer-implemented method of saving at least some data within volatile storage to non-volatile storage when a computer system panics is described. The method includes the steps of: the computer system defining a specified portion of volatile storage (1) containing data to be saved as a dump device (2), rebooting (8) the computer system without affecting the data within the dump device, and the computer system copying (12) the data in the dump device to non-volatile storage (13). A reboot of the computer system after copying the data to non-volatile storage is not necessary for the computer system to begin (14) normal operation.

51 Claims, 8 Drawing Sheets

| Server configuration | MRDD size | Projected system downtime - upper limit | Projected system downtime - lower limit |
|---|---|---|---|
| N-class with 16GB RAM, 3.5 MB/sec dump rate | 25% of RAM | 1 hour 20 min. | 1.2 hours |
| N-class with 16GB RAM, 3.5 MB/sec dump rate | 10% of RAM | 21 min. | 19 min. |
| Superdome with 256 GB RAM, 4 MB/sec dump rate | 25% of RAM | 5 hours | 4.5 hours |
| Superdome with 256 GB RAM, 4 MB/sec dump rate | 10% of RAM | 2 hours | 1.8 hours |

Figure 8

METHOD AND APPARATUS FOR DUMPING MEMORY

FIELD OF INVENTION

The present invention relates to a method and apparatus for dumping memory. More particularly, but not exclusively, the present invention relates to a method and apparatus for dumping memory from volatile storage to non-volatile storage when a system panics.

BACKGROUND OF THE INVENTION

Dump systems allow for the state of a machine (core) to be saved at crash time for later analysis. Traditionally the dump subsystem of a UNIX kernel will write relevant data to a disk-based dump device at crash time.

Technological innovations both in memory configurations and disk input/output interfaces (I/Os) have made tremendous progress the past few years. However, disk I/Os have not been able to keep pace with memory speeds. Hence disk I/Os required during the writing of data to the disk-based dump device when the system panics (crashes) increases system down time in a perceptible manner to the user. This is of most significance when the dumpable memory is large such as in relation to mid and high-end UNIX boxes which typically have terabytes of primary memory.

However, there exist some systems which do not rely on a disk subsystem at the time of a system panic.

Mission Critical Linux's system, "mcore", does not rely on a disk-based dump device, but instead uses system memory to save the core. On a subsequent reboot of the system the core can be transferred to the file-system. However, actual experiments with "mcore", and documentation at oss.missioncriticallinux.com/projects/mcore/ readme.php indicate that the system may be in an unstable state following the first reboot. So a second reboot is necessary. This may not be an issue in low-end UNIX boxes where primary memory is less, but would assume significance in high-end boxes as the additional reboot considerably adds to system downtime. In addition, "mcore" is a 32-bit solution and is not available for the mid to high-range UNIX boxes running 64 bit OSes.

Tru64 is a system which is capable of dumping memory pages to main memory when a system panics. However, the dumping method used by Tru64 has a number of disadvantages. Firstly, it does not treat a portion of the RAM in main memory as a system dump device. Thus the Tru64 method only dumps to main memory when there is enough space within the main memory for the entire dump. And secondly, this method is only used for diskless machines—to date it is not used for machines with disks.

It is an object of the present invention to provide a method and apparatus for dumping memory which avoids some of the above disadvantages or at least provides a useful alternative.

SUMMARY OF THE INVENTION

According to a first aspect of the invention there is provided a computer-implemented method of saving at least some data within volatile storage to non-volatile storage when a computer system panics, including the sequentially occurring steps of:
 i) the computer system defining a first portion of volatile storage containing data to be saved as a dump device;
 ii) rebooting the computer system without affecting the data within the dump device; and
 iii) the computer system copying the data in the dump device to non-volatile storage;
 wherein a reboot of the computer system after step (iii) is not necessary for the computer system to begin normal operation.

Preferably, the data within the first portion of volatile storage is copied there from a second portion of volatile storage after the computer system panics.

Other processes in the computer system may be able to execute concurrently with step (iii).

It is preferred that some or all of the first portion of volatile storage is able to be used normally by the computer system before step (i) and after step (iii).

The volatile storage may be the primary memory of the computer system. The volatile storage may be RAM.

In addition to the data within the first portion of volatile storage there may be additional data to be dumped from volatile storage. The computer system may copy this other data from volatile storage directly to non-volatile storage after panicking and before rebooting. It is preferred that this other data is only copied when the combined size of the data and the other data exceeds the size of the dump device.

The data may be comprised of pages. The pages may be selected for dumping using selective page classification, intelligent selective page classification or a combination of both, or, alternately, all the pages may be selected for dumping.

The first portion of volatile storage may blocked for use by other processes after rebooting the computer system and before all the data is copied to non-volatile storage. Alternatively, the data may be copied to non-volatile storage in blocks and after each block has been copied it can be freed for use by other processes.

It is preferred that the non-volatile storage is a disk device. Alternatively, the non-volatile storage may be a tape device.

It is preferred that the first portion of volatile storage resides at the high end of memory.

Preferably, the dump device is comprised of a single segment of volatile storage.

When rebooting the computer system may initiate a firmware emulator reboot or a firmware reboot.

The computer system panic may be caused by a software failure, hardware failure, or a transfer of control.

It is preferred that the computer system is executing a 64-bit operating system.

A user of the computer system may define the size of the first portion of volatile storage. The size may be defined as a proportion of the total primary memory.

According to a further aspect of the invention there is provided an apparatus for saving at least some data within volatile storage to non-volatile storage when a computer system panics, including:
 i) volatile storage storing the data within a first portion of the volatile storage;
 ii) non-volatile storage arranged for storing the data; and
 iii) a processor arranged when the computer system panics to define the first portion of volatile storage as a dump device, to then initiate a restart of the computer system without affecting the data within the dump device, and to then copy the data within the dump device to the non-volatile storage;
 wherein after copying the data to the non-volatile storage it is not necessary to restart the computer system before beginning normal operation of the computer system.

BRIEF DESCRIPTION OF THE DRAWINGS

Embodiments of the invention will now be described, by way of example only, with reference to the accompanying drawings in which.

DETAILED DESCRIPTION OF A PREFERRED EMBODIMENT OF THE INVENTION

The present invention relates to a method and apparatus for dumping pages within volatile storage to non-volatile storage after a system panic. The method will be described in relation to a system where the data is stored using a page-based system.

A system panic for the purposes of this document includes the following:
1. A software failure leading to:
   a. Hard-coded calls to the 'panic' interface by a kernel subsystem upon occurrence of an unrecoverable internal software error.
   b. Unresolved page faults occurring when the kernel's page fault trap handler calls panic when a kernel subsystem resolves to a virtual or physical memory address that does not point within the kernel memory.
2. A hardware failure—known as High Priority Machine Check (HPMC) in PA-RISC or Machine Check Abort (MCA) in the Itanium Processor Family (IPF).
3. A Transfer of Control (TOC)—a sysadmin issues a TOC by pressing a button in the box or using a command through the MP firmware of the system console, which causes the kernel to dump the physical memory.

Volatile storage includes memory, such as RAM, which loses stored data when power is switched off.

Non-volatile storage includes memory, such as disks and tapes, which does not lose stored data when power is switched off.

Figure 1:
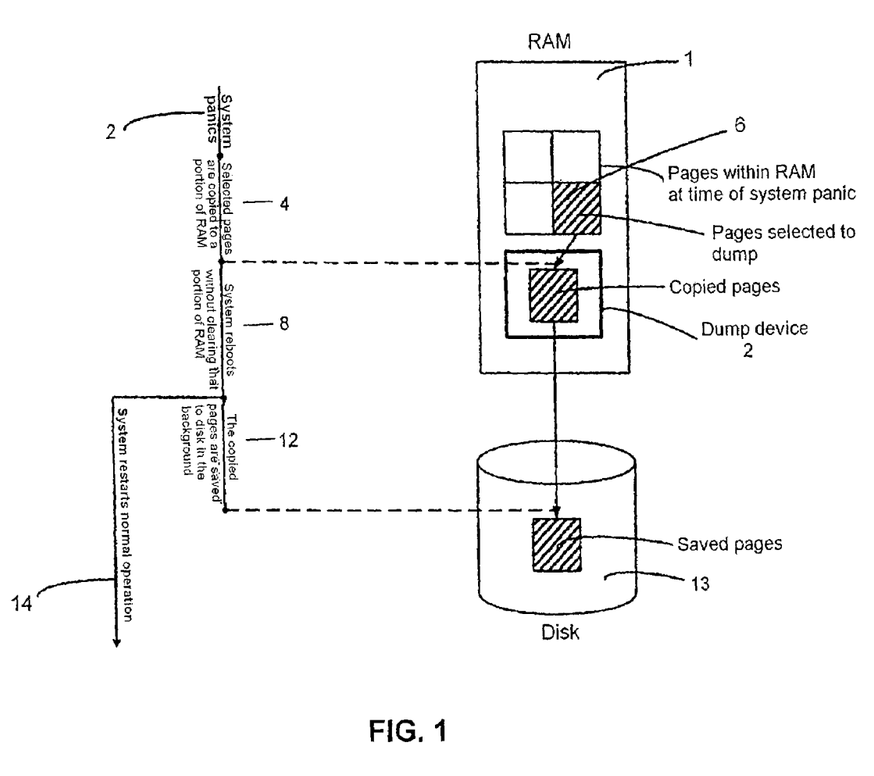
FIG. 1: illustrates an exemplary embodiment of a first method of the invention in which pages selected to be saved are copied to a portion of volatile memory designated as the dump device.
Figure 2:
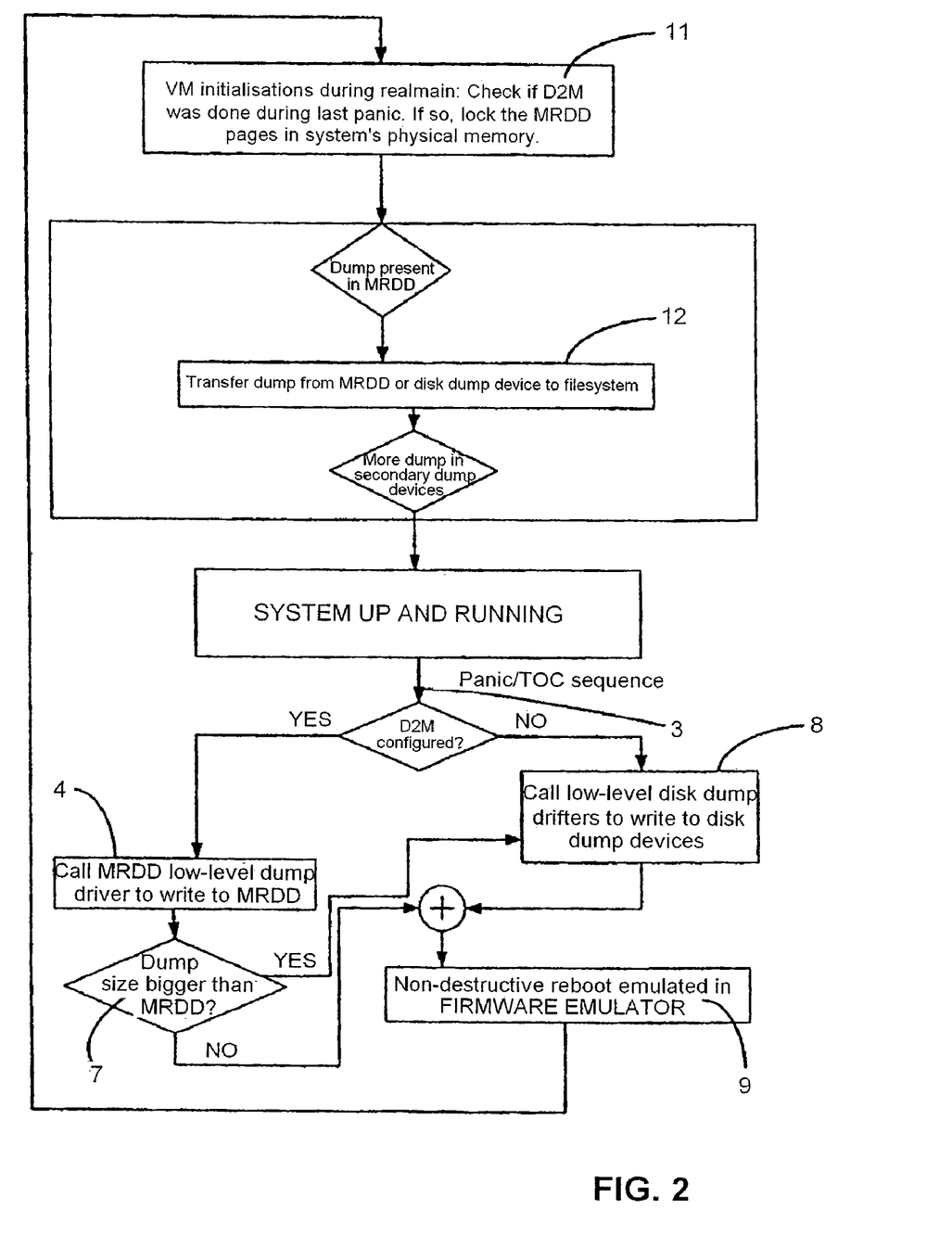
FIG. 2: illustrates a flow diagram of a preferred implementation of the first method of the invention.

A first method of the invention will now be described with reference to FIGS. 1 and 2.

The method chooses a portion of primary memory 1 as the primary dump device 2. Primary memory is volatile storage, such as RAM.

The chosen portion of RAM is designated as the Memory Resident Dump Device (MRDD) 2.

The size of the MRDD can be dynamically configured by the user. In such a case, the size of MRDD can be defined by a percentage value of the total RAM in the primary memory.

Following a system panic, a dump subsystem dumps memory pages into dump devices. The method configures the MRDD as the primary dump device by making appropriate entries in the kernel data structures as shown in FIG. 2. Hence, when the system panics 3, the contents of memory are written 4 into the MRDD 2 by the dump subsystem as the MRDD 1 is now configured as the primary dump device.

In one implementation, the method defines the portion of primary memory as the MRDD prior to the panic, for example, during the start up of the system. The portion of primary memory is allocated for use by the MRDD only and may not be used by the system during normal operation. The advantage of this approach is that the kernel can guarantee the availability of the MRDD area, and make the kernel data structures consistent. The disadvantage of this approach is that the MRDD pages cannot be used by the running system until it panics.

In a preferred implementation, the method defines the portion of primary memory as the MRDD at the time of the system panic. The advantage of this approach is that as the kernel does not reserve the MRDD space at system start-up, the memory is available for normal use by the system.

Figure 3:
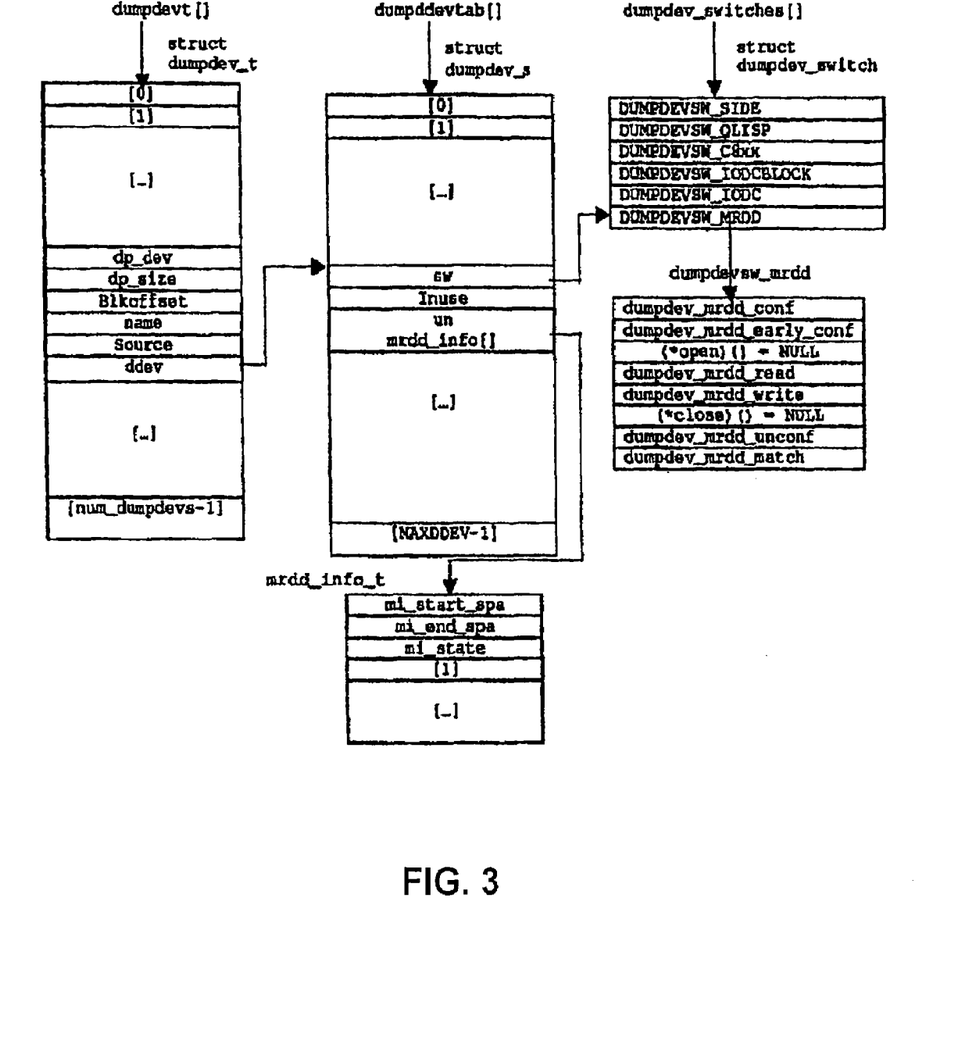
FIG. 3: illustrates how the MRDD is defined as the primary dump device within the kernel data structures.

FIG. 3 illustrates how the method chooses the MRDD from the high end of primary memory 5. However, it will be appreciated by those skilled in the art that the MRDD could be chosen from any part of the memory.

Due to memory use by the system prior to panic and the size of pages required for the MRDD, the MRDD may be comprised of several non-contiguous segments. In order to reduce the difficulties of the MRDD being comprised of numerous segments, the method can choose to select a minimum number of contiguous pages for each MRDD segment.

During the system panic 3 the method copies 4 the pages that have been selected in step 6 for dumping into the MRDD 2.

When the method is implemented within HP-UX, bcopy( ), or an equivalent kernel routine, is utilised to copy the pages from their original location to the MRDD.

If the size of all the pages that have been selected for dumping is larger than the size of the MRDD in step 7, the excess pages may be saved directly to non-volatile storage in step 8. In such a case, down time of the system will be affected by the required disk I/Os but will still be reduced due to the proportion of pages residing in the MRDD.

There are a number of different ways in which pages can be selected for dumping. These include:
1. Selective page classification—a static method of page selection also known as "Selective dump" which involves classifying pages into a number of different categories and configuring the memory dumps to dump only those pages falling within certain classifications.
   For example, the kernel can setup classification of all kernel pages. The pages could be classified as: kernel static data, kernel dynamic data, kernel text, user stack, file system meta data, kernel buffer cache, unused pages, superpages, etc. Of the above, kernel static data, kernel dynamic data, filesystem meta data, and user stack data could be defined to be dumped by default. Users can change this configuration at runtime of the system.
2. Intelligent Selective page classification—a crash-time dynamic method of page classification based on an expert system.
3. Entire memory dump—all the pages are selected for dumping.

After the pages have been copied into the MRDD, the method reboots the system in step 9. Preferably, the rebooting process is initiated by the system after the dump to the MRDD is complete. A lesser preferred option is for another device to initiate the reboot.

When a system reboots, the memory is normally overwritten and cleared by processor dependent code (firmware) for random memory tests.

In order for the pages within the MRDD to be saved after the reboot the method ensures that the contents of the MRDD are preserved when the system reboots.

Figure 4:
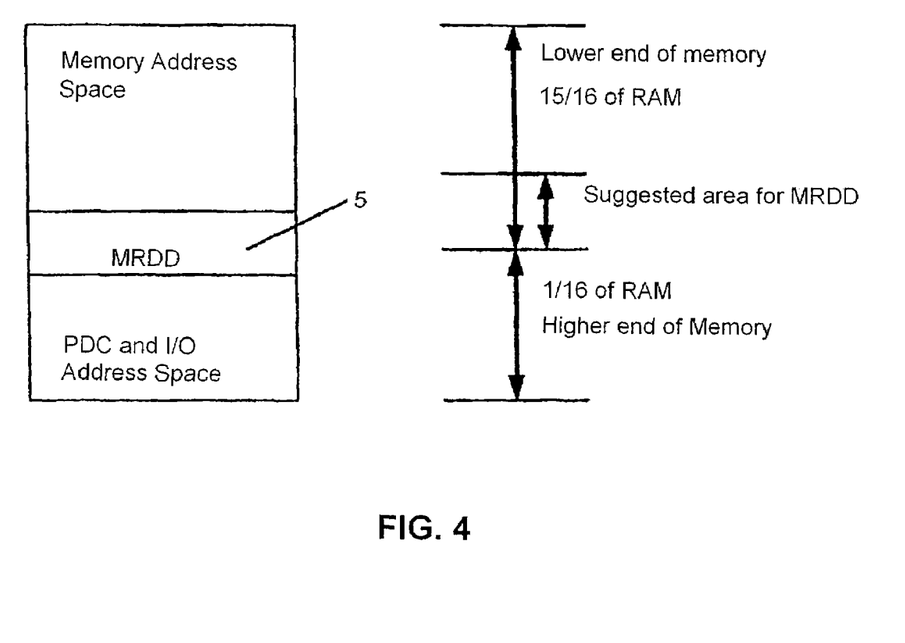
FIG. 4: show a memory stack illustrating a preferred location within memory for the MRDD.

To ensure that the contents are preserved, one implementation of the method, after pages are dumped to the MRDD (and other dump devices if necessary), utilises a firmware emulator 10 to trap the PDC_BROADCAST_RESET calls following a system panic, send a directed CMD_RESET to the processors from the OS level, and then transfer control to a kernel loader which would launch an HP-UX kernel. The firmware emulator is software, pre-programmed into the PROM, which is a mini version of the firmware for doing memory tests. In essence the firmware emulator will skip the destructive tests but undertake the non-destructive tests and then call the boot loader to initiate a reboot. This preserves the data within the MRDD without compromising the stability of the system following the reboot.

FIG. 4 shows where a firmware emulator 10 could reside in the software stack of a system.

In another implementation of the method, the firmware may be enhanced, such that it can be programmed by the HP-UX kernel to prevent the memory tests if the MRDD is active.

Once the system has been restarted, the MRDD pages are prevented in step 11 from being allocated to any other process.

In step 12, the method then transfers the contents of the MRDD into a file-system on non-volatile storage (secondary memory) 13, such as disk or tape.

The method transfers the pages in the MRDD 2 to secondary memory 13 using a process which runs in the background. Therefore, in step 14 the system can restart and begin normal operation during the transfer to secondary memory stage. Consequently system downtime is reduced.

After pages within the MRDD 2 have been transferred in step 12 to secondary memory 13 the pages may be released for use by the system during normal operation.

In one implementation of the method, the entire contents of the MRDD are transferred to disk before the pages used by the MRDD are released for the system.

In a preferred implementation of the method, a fixed amount of data (an MRDD_CHUNK) is read from the MRDD, written to secondary memory and then immediately freed for use by the system. This is repeated until all the MRDD contents are read and freed.

Alternatively:
1) some of the pages in the MRDD can be released without being saved; or
2) some/all of the pages in the MRDD can be blocked from normal system use even after being written to secondary memory.

The first alternative might be used where it is clear to the user or a debugging program that some of the pages are not required.

The second alternative might be used when the user intends to immediately review the core to determine the cause of the system panic.

Figure 5:
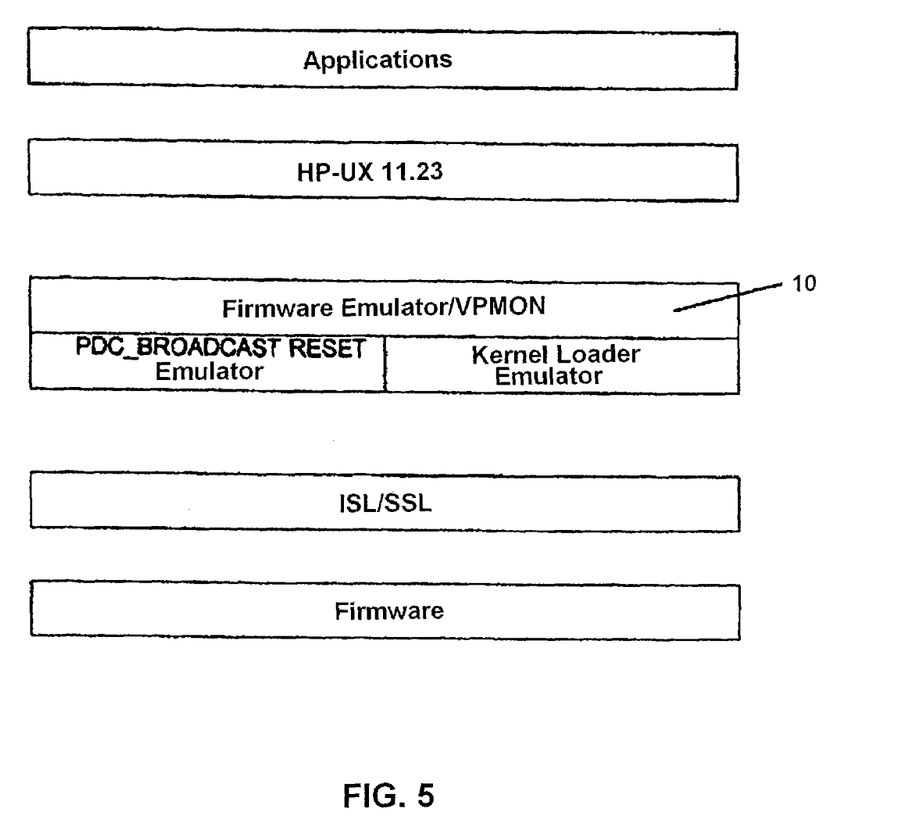
FIG. 5: shows a software stack of a system and a preferred location for a firmware emulator within the stack.

Referring to FIG. 5, a second method will be described.

The portions of volatile storage containing the pages 20 that have been selected for dumping are themselves designated in step 21 by the method as the MRDD 22 at the time of system panic 23. This method does not require memory pages be copied to a different MRDD location.

The method then reboots the system in step 24 using a reboot which does not clear the MRDD.

Once the system is back up, the MRDD pages are prevented from being allocated to any other process.

The contents of the MRDD are transferred in step 25 into a file-system on non-volatile storage 26.

After the transfer is complete, the MRDD pages are freed and can be used by the system.

The advantage of the second method over the first method is that the memory-to-memory copying of pages from existing primary memory location to the MRDD is not required. The disadvantage of the second method is that defining the selected pages as the MRDD results in a MRDD comprised of numerous segments which can reduce the efficiency of memory allocation by the system after the reboot.

Memory dumping after panics is managed in most systems by a kernel module called the "dump subsystem". It is the dump subsystem which will use a method of the invention. For example, in HP-UX, for process context panics, the dump subsystem executes within the context of the panicking process. For panics in an interrupt context, the dump subsystem is executed by the panicking processor.

Alternatively, a latent panic thread executing during operation of the system may use a method of the invention to manage system panics.

The methods are preferably utilised for high-end and mid-range 64 bit boxes, such as:
a) HP PA-RISC—N or L class servers, Superdome, Matterhorn etc; and
b) HP IPF—Longs Peak, Wilson Peak, Orca, Medel, Reinier, Olympia etc.

The methods will have the greatest benefit for the high-end platforms (for example, Orca, which has a very large amount of primary memory). However, the methods may be implemented on all platforms where there is support from the kernel subsystems.

Figure 6:
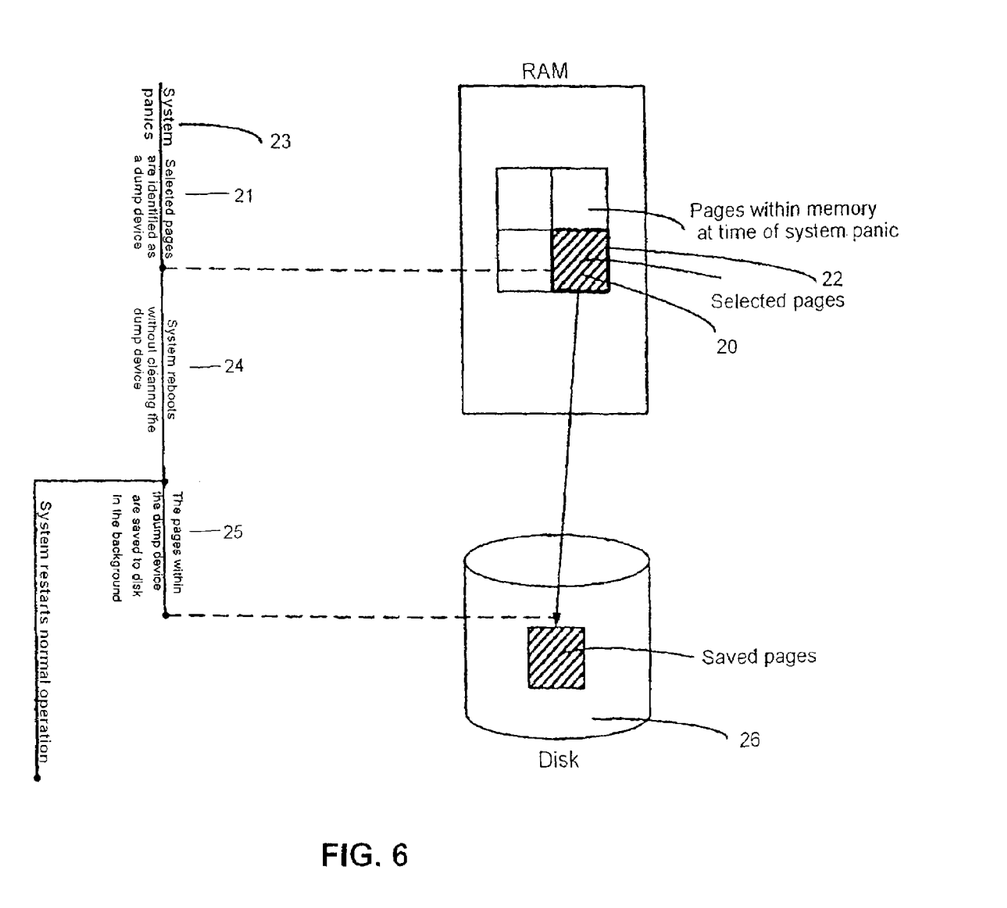
FIG. 6: illustrates an exemplary embodiment of a second method of the invention in which the volatile memory storing the pages selected to be saved is designated as the dump device.

FIG. 6 displays a graph which compares the I/O speed of primary memory to secondary memory transfers as used by most existing methods for dumping memory, and a graph which compares dump time to primary memory size.

FIG. 6 shows that the I/O speed of the dump path for has been relatively constant at 3-4 MBps (Megabytes per second), while during the same timeframe, the Maximum Physical Memory configurations have increased from 8 Gigabytes to 64 to 256 and, now with Orca (cell-based architecture), to 2048 Gigabytes. This figure shows a memory configuration of 512 Gigabytes and at the current rate of 4 MBps, it would take 35.5 hours to dump all 512 Gigabytes of memory. With 2048 Gigabytes, it would take 142 hours (approximately 6 days) to dump the entire memory configuration.

It is extremely rare that a full dump is ever needed. Often dumps are configured to dump pages falling within certain page classifications.

A study of customer dumps (over 100) has shown that the selected dump method requires only 20% (+/−5%) of actual physical memory to be dumped. A large section of physical memory is not required in future crash dump analysis, as it is comprised mainly of UNUSED and USER pages.

Figure 7:
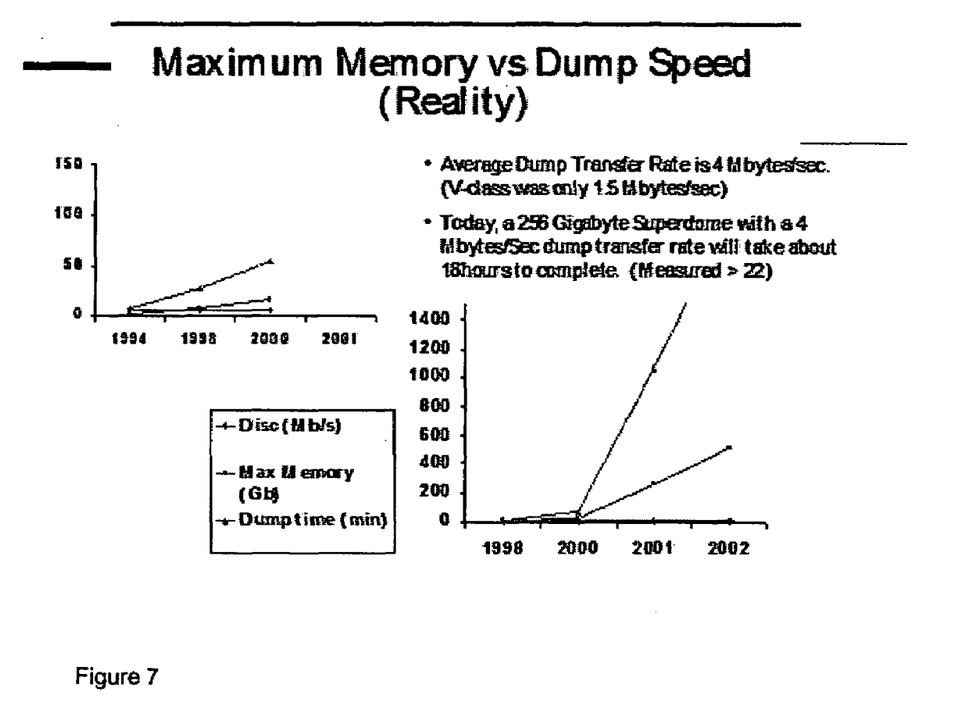
FIG. 7: shows two graphs comparing the speed of memory transfers and dump time compared to primary memory size.
Figure 8:
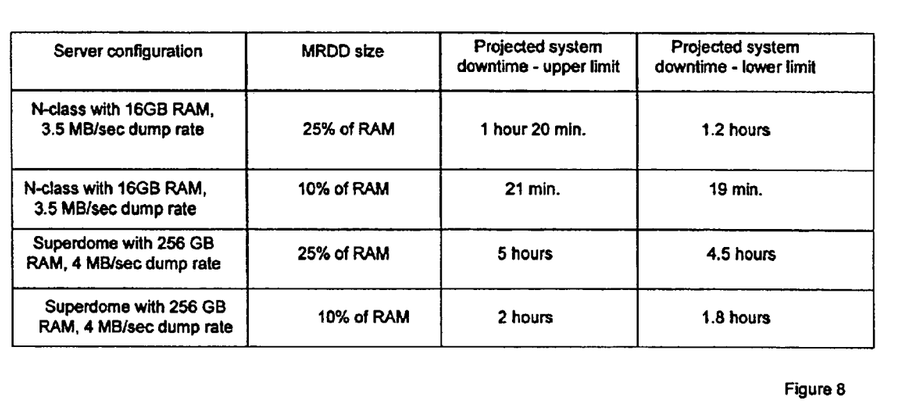
FIG. 8: shows a table comparing system down times for various configurations.

FIG. 7 shows the decrease in system downtime for certain system configurations when the method of the invention is utilised.

One advantage of the present invention is that down time of systems after a panic is minimised because saving of selected pages to non-volatile storage, such as disk, is performed after the system is restarted.

In addition, as the method of the invention can be performed in the background, an advantage of the present invention is that memory used by MRDD may be returned back to the system in stages (in sizes of a tunable MRDD_CHUNK that would allow pages to be returned back to the system as and when these pages are transferred to the file system) or in full (when the entire MRDD is returned to the system after all its pages are written to the file system).

A further advantage of the invention is that the MRDD is treated like any other dump device. It is represented in the kernel data structures as any other device. This makes the design more robust and uniform.

A further advantage of the invention is that when the size of the pages to be dumped exceeds the capacity of the MRDD the pages may be dumped to a secondary dump device, such as secondary memory. In such a case down time of the system would be longer than if the MRDD had the capacity but down time would be shorter than if all the pages were dumped to secondary memory.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A computer-implemented method of saving at least some data within volatile storage of a computer system to non-volatile storage when the computer system panics, the computer system having an operating system kernel, said method including the sequentially occurring steps of:
   i) the computer system defining a first portion of volatile storage containing data to be saved as a dump device;
   ii) the computer system experiencing a system panic;
   iii) rebooting the computer system without affecting the data within the dump device by initiating a firmware emulator reboot which:
      traps or avoids instructions clearing said non-volatile storage after experiencing the panic and
      causes the operating system kernel to be loaded by a kernel loader after experiencing the panic; and
   iv) the computer system copying the data in the dump device to non-volatile storage; wherein a reboot of the computer system after step iv is not necessary for the computer system to begin normal operation.

2. A method as claimed in claim 1 including the step of: the computer system copying the data to be saved from a second portion of volatile memory to the first portion of volatile memory; wherein this step occurs after the computer system panics and before step (i).

3. A method as claimed in claim 2 wherein a process of the computer system performs step (iii) concurrently with the execution of at least one other process of the computer system.

4. A method as claimed in claim 3 wherein at least some of the first portion of volatile storage is allocated for normal use by the computer system before step (i) and after step (iii).

5. A method as claimed in claim 4 wherein the entire first portion of volatile storage is allocated for normal use by the computer system before step (i) and after step (iii).

6. A method as claimed in claim 4 wherein the volatile storage is the primary memory of the computer system.

7. A method as claimed in claim 6 including the step of: the computer system copying at least some other data within the volatile storage to a portion of non-volatile storage; wherein this step occurs after the computer system panics and before step (ii).

8. A method as claimed in claim 7 wherein the step of the computer system copying at least some other data occurs only when the total size of the data to be saved in the dump device and the other data is greater than the size of the dump device.

9. A method as claimed in claim 6 wherein the volatile storage is RAM.

10. A method as claimed in claim 9 wherein the data is to be saved is comprised of one or more pages.

11. A method as claimed in claim 10 wherein at least some of the pages are selected using selective page classification.

12. A method as claimed in claim 11 wherein at least some of the pages are selected using intelligent selective page classification.

13. A method as claimed in claim 10 wherein all of the pages in the volatile memory are selected.

14. A method as claimed in claim 10 wherein the first portion of volatile storage is prevented from being allocated for use by other processes after step (ii) until step (iii) is complete.

15. A method as claimed in claim 14 wherein the non-volatile storage is disk.

16. A method as claimed in claim 15 wherein the first portion of volatile storage resides at the high end of the memory.

17. A method as claimed in claim 16 wherein the dump device is comprised of a single segment.

18. A method as claimed in claim 16 wherein the computer system reboots itself in step (ii).

19. A method as claimed in claim 18 wherein the firmware emulator reboot is software preprogrammed into read only memory, said software skipping otherwise normal destructive volatile memory testing and calling said boot loader to initiate a reboot of the computer system.

20. A method as claimed in claim 18 wherein rebooting the computer system initiates a firmware reboot.

21. A method as claimed in claim 18 wherein the system panic is caused by a software failure.

22. A method as claimed in claim 18 wherein the system panic is caused by a hardware failure.

23. A method as claimed in claim 18 wherein the system panic is caused by a transfer of control.

24. A method as claimed in claim 18 wherein the computer system includes a 64 bit operating system.

25. A method as claimed in claim 18 wherein a user defines the size of the first portion of volatile storage.

26. A method as claimed in claim 25 wherein the size is defined as a proportion of the total primary memory.

27. A method as claimed in claim 14 wherein the non-volatile storage is tape.

28. A method as claimed in claim 10 wherein the data in the dump device is copied to non-volatile storage in step (iii) in a plurality of blocks and each block is allocated for normal use by the computer system only after it has been copied.

29. A dump subsystem apparatus implementing the method of claim 1.

30. A memory device storing a program for enabling a computer system to perform the method of claim 1.

31. A computer apparatus for performing the method of claim 1.

32. An apparatus for saving at least some data within volatile storage to non-volatile storage when a computer system experiences a panic, including:
- i) volatile storage storing the data within a first portion of the volatile storage;
- ii) non-volatile storage arranged for storing the data; and
- iii) a processor arranged when the computer system experiences the panic to define the first portion of volatile storage as a dump device, to then initiate a restart of the computer system without affecting the data within the dump device by initiating a firmware emulator reboot which:

traps or avoids instructions clearing said non-volatile storage during the restart after experiencing the panic and causes an operating system kernel to be loaded by a kernel loader after experiencing the panic, and to then copy the data within the dump device to the non-volatile storage; wherein after copying the data to the nonvolatile storage it is not necessary to restart the computer system before beginning normal operation of the computer system.

33. An apparatus as claimed in claim 32 wherein the processor is further arranged to copy the data to be saved from a second portion of volatile memory to the first portion of volatile memory after the computer system panics and before the first portion of volatile storage is defined as a dump device.

34. An apparatus as claimed in claim 33 wherein the processor copies the data within the dump device to non-volatile storage concurrently with the execution of at least one other process of the computer system.

35. An apparatus as claimed in claim 34 wherein at least some of the first portion of volatile storage is allocated for normal use by the computer system before defining the first portion of volatile storage as the dump device and after the data is copied.

36. An apparatus as claimed in claim 35 wherein the entire first portion of volatile storage is allocated for normal use by the computer system before defining the first portion of volatile storage as the dump device and after the data is copied.

37. An apparatus as claimed in claim 35 wherein the volatile storage is the primary memory of the computer system.

38. An apparatus as claimed in claim 37 wherein the processor is further arranged to copy at least some other data within the volatile storage to a portion of non-volatile storage after the computer system panics and before restarting the computer system.

39. An apparatus as claimed in claim 37 wherein the volatile storage is RAM.

40. An apparatus as claimed in claim 39 wherein the data to be saved is comprised of one or more pages.

41. An apparatus as claimed in claim 40 wherein at least some of the pages are selected using selective page classification.

42. An apparatus as claimed in claim 41 wherein at least some of the pages are selected using intelligent selective page classification.

43. An apparatus as claimed in claim 37 wherein all of the pages in the volatile memory are selected.

44. An apparatus as claimed in claim 40 wherein the first portion of volatile storage is prevented from being allocated for use by other processes after the restart of the computer system until all the data within the dump device has been copied to the non-volatile storage.

45. An apparatus as claimed in claim 40 wherein the data in the dump device is copied to non-volatile storage in a plurality of blocks and each block is allocated for normal use by the computer system only after it has been copied.

46. An apparatus as claimed in claim 40 wherein the non-volatile storage is disk.

47. An apparatus as claimed in claim 46 the firmware emulator reboot is software preprogrammed into read only memory, said software skipping otherwise normal destructive volatile memory testing and calling said boot loader to initiate a reboot of the computer system.

48. An apparatus as claimed in claim 46 wherein the restart of the computer system initiates a firmware reboot.

49. An apparatus as claimed in claim 46 wherein the processor is executing a 64 bit operating system.

50. An apparatus as claimed in claim 46 wherein a user defines the size of the first portion of volatile storage.

51. A computer system including the apparatus of claim 32.

* * * * *